United States Patent [19]

Singh

[11] Patent Number: 5,628,015
[45] Date of Patent: May 6, 1997

[54] METHOD FOR UNLOCKING SOFTWARE FILES LOCKED TO A SPECIFIC STORAGE DEVICE

[75] Inventor: Jitendra K. Singh, San Jose, Calif.

[73] Assignee: Hewlett-Packard Company, Palo Alto, Calif.

[21] Appl. No.: 547,969

[22] Filed: Oct. 24, 1995

Related U.S. Application Data

[60] Continuation of Ser. No. 210,828, Mar. 18, 1994, abandoned, which is a division of Ser. No. 976,176, Nov. 13, 1992, Pat. No. 5,327,563.

[51] Int. Cl.⁶ .................................................. G06F 12/14
[52] U.S. Cl. ............................................................. 395/186
[58] Field of Search ........................... 395/650, 700; 380/4

[56] References Cited

U.S. PATENT DOCUMENTS

| | | | |
|---|---|---|---|
| 4,577,289 | 3/1986 | Comerford et al. | 364/DIG. 2 |
| 4,584,641 | 4/1986 | Guglielmino | 364/DIG. 1 |
| 4,658,093 | 4/1987 | Hellman | 380/25 |
| 4,740,890 | 4/1988 | William | 395/186 |
| 4,757,533 | 7/1988 | Allen et al. | 380/25 |
| 4,796,220 | 1/1989 | Wolfe | 364/DIG. 2 |
| 4,888,798 | 12/1989 | Earnest | 380/4 |
| 4,903,296 | 2/1990 | Chandra et al. | 380/4 |
| 5,014,234 | 5/1991 | Edwards, Jr. | 364/DIG. 2 |
| 5,027,396 | 6/1991 | Platteter et al. | 380/4 |
| 5,027,398 | 6/1991 | Miyoshi | 380/4 |
| 5,113,518 | 5/1992 | Durst et al. | 395/550 |
| 5,155,827 | 10/1992 | Ghering | 395/425 |
| 5,212,729 | 5/1993 | Schafer | 380/4 |
| 5,267,311 | 11/1993 | Bakhoum | 380/4 |
| 5,287,407 | 2/1994 | Holmes | 380/4 |

OTHER PUBLICATIONS

Reinhard Posch, "Conceptual view of MS-DOS file system security" Dec. 1991.

*Primary Examiner*—Kevin A. Kriess
*Assistant Examiner*—John Q. Chavis

[57] ABSTRACT

The present invention provides a method for unlocking software programs which have been locked to a particular disk by the method described in U.S. Pat. No. 5,327,563. This unlocking method determines if a software program has been moved to a new location since it was originally written to a magnetic disk. In addition this method determines if the program has been executed more than a preset number of times and deciphers the software program if deciphering is authorized.

3 Claims, 15 Drawing Sheets

METHOD FOR UNLOCKING SOFTWARE FILES LOCKED TO A SPECIFIC STORAGE DEVICE

CROSS REFERENCE TO RELATED APPLICATION

This is a continuation of copending application Ser. No. 08/210,828 filed on Mar. 18, 1994, now abandoned, which is a divisional of copending application Ser. No. 07/976,176 filed on Nov. 13, 1992 and now issued as U.S. Pat. No. 5,327,563.

FIELD OF THE INVENTION

This invention relates to computers incorporating disk systems. In particular this invention relates to locking disk files to prevent unauthorized use or modifications of the disk files.

BACKGROUND

Fifteen years ago, computers were used in specialized applications and used programs specifically designed to accomplish a specialized task. The few computer operators were highly trained in the use of computers and there were very few people that had computers in the home. Today, millions of people have computers in their home and office. What was a small market for computer programs is now huge.

Along with the growth in the software programs market has come the need for mass distribution of software programs. As many of the programs developed for personal computers are costly, the prospective buyers want to be able to test the program before they buy it. Further, they want to test the program on their computer in their home or office. The suppliers of software programs would like to widely distribute their software for buyers to test but, of course, there must be some means to prevent people from copying and preventing unlimited use of the program. In addition to protecting the program, purchasing the software must be as convenient as possible for the buyer.

Prior art methods have been developed to try to protect software however they have not meet with acceptance by both the software suppliers and the users. Some of the prior art methods required additional hardware which increased the cost of the product and made the use of the product inconvenient for the user. Other methods required a special floppy disk to be in a disk drive for the software to work. However, users disliked having to keep track of the floppy disk.

What is needed in the industry is a method for distributing trial software to users that allows the users to conveniently test the software while, at the same time, protecting the interests of the software developers. Also, there is a need for a method to allow the buyers to easily purchase the software.

SUMMARY OF THE INVENTION

The present invention provides a method whereby trial versions of software programs can be widely distributed to prospective users while, at the same time, preventing copying or unlimited use of the programs. The users are thus able to test the programs on their particular computer systems and use the programs as they would if they bought the programs. Also, the present invention provides for a convenient way for the users to buy the programs with out having to leave their homes or offices.

In a preferred embodiment of the present invention, the user is given an encrypted version of the application program the user requests and an installation program. The installation program further encrypts, renames and loads the application program onto a hard disk in the user's computer system. In addition, the install program creates one or more randomly named files which are also loaded onto the hard disk. Each of the random files contain the location, on the hard disk, of the application program, the other random files and its own disk location. Also, the random files contain information about the number of times the user has executed the application program.

The installation program also creates a trial program that is given the name of the application program before the application program was renamed. This trial program is the program the user executes when the user wants to run the application program. The trial program tests to see if the application program and random files are still located at the same absolute disk locations and tests to see if the user has exceeded the permitted number of times the application can be run.

If the trial program determines the programs have not been moved, and the user is still authorized to use the program, then the trial program loads and executes the application program. However before the application program executes, the user is given the opportunity to enter a password to eliminate all of the program protection features. Typically, the user will call a phone number and purchase the application program and be given the password at that time.

The present invention effectively locks the application program to the specific hard disk it is loaded onto. Because the trial program knows where the application program and random files should be located, any attempt to make a copy of the application program or the random files will fail as their locations will change due to the inherent features of the Microsoft Disk Operating System (MS-DOS). Also, for a typical user with many files stored on the hard disk, identifying the random files would be problematic. In addition, each time the application program is executed, the trial program creates new random files with random names so that any attempt to copy the old random files will not be effective to defeat the protection features.

This new and novel program protection method permits the user to test an application program before it is purchased while protecting the rights of the software distributors.

DETAILED DESCRIPTION OF THE INVENTION

Figure 1A:
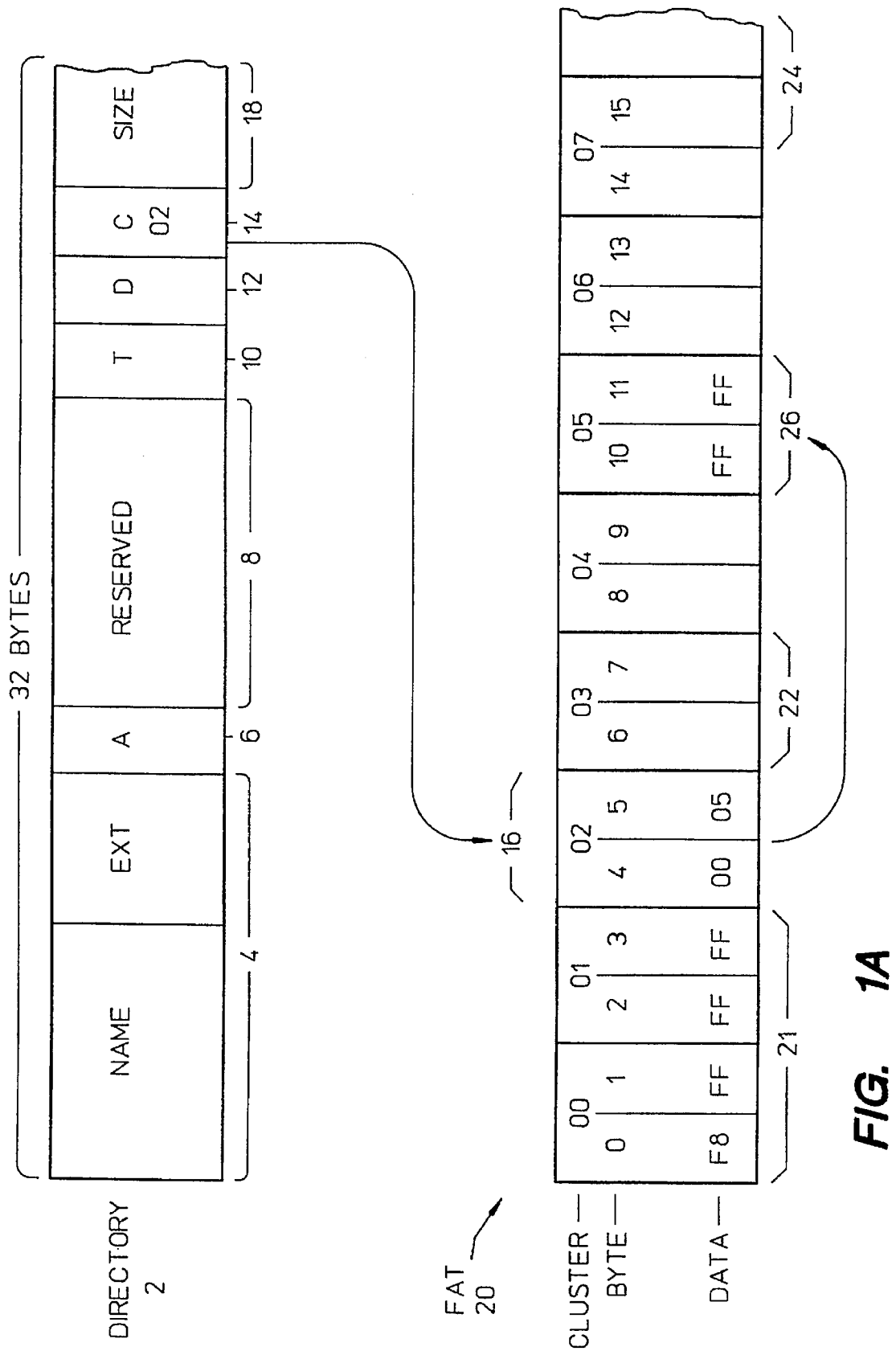
FIG. 1A illustrates the MS-DOS directory and the FAT file system.

This invention makes it possible to lock computer files to the hard disk. The method of the present invention makes it possible to detect whether a file has been copied over its self or not. The motivation to lock files to a computer disk arises in situations where some metering information needs to be saved on the disk and where there may be some incentive for users to prevent the metering information from being incremented. For instance, in the case of application software that is distributed on a trial basis, that is the software can be executed some predefined number of times, trial count information may be saved on the hard disk. Without locking this file, it is possible for a user to maintain an original copy of the file (with the trial count set to the maximum count allowed) and copy this on to the hard disk each time he wants to run the application, effectively preventing the trial count information from being decremented.

Locking the application program involves the following process:

a. creating several files with the first one having a fixed name and the other(s) having random names b. saving the head, cylinder, sector information for each of the files in each of the files together with the count information c. saving the name of all the files in the first file with the fixed name d. encrypting all the files With these operations, if an individual saves the file (containing count information) and then copies it back to the disk prior to executing the trial application, it would be detected by virtue of the fact that the head, cylinder and sector information written into the file would no longer be consistent with the actual head, cylinder and sector occupied by the file. Any scheme used by the user to relocate the file back to the same physical location on the disk will also fail due to there being a set of files with random names. Since the files are randomly generated each time the trial application executes, in most systems with many files, it would be very difficult to identify which set of files were created thereby enhancing the security of the protection method.

MS-DOS and Hard Disk File Organization

While the method of the present invention is applicable to many operating systems, a preferred embodiment will be described as it is implemented with the MS-DOS operating system. MS-DOS is also marketed under other brand names. For example, the IBM Personal Computer Disk Operating System (PC-DOS) is, with minor exceptions, a relabeled MS-DOS. The operation of the MS-DOS/PC-DOS (DOS) is well understood by those skilled in the art and the technical features of the operating system are documented in the IBM "Disk Operating System Technical Reference", version 5.00. Additional operating system information is published in "The MS-DOS Encyclopedia", published by Microsoft Press, Redmond, Wash., 1988.

As a feature of the present invention is the locking of the application program and other files to the hard disk, a basic understanding of a hard disk and the file structure of MS-DOS is useful. A hard (fixed) disk typically has multiple disk platters. Each platter is coated with magnetic material and typically one magnetic disk head per platter surface is provided to record data onto the platter surface. Each of the disk heads are mounted on a common arm which is moved in discrete increments to locate the heads on a particular disk cylinder. A cylinder is comprised of all the disk tracks that line up under a head. For example if a disk has two platters and therefore four disk heads, there would be four tracks that make up a cylinder. Each track is divided into sectors with each sector storing multiple bytes of data. The number of sectors is determined when the disk is formatted by a format program.

Allocation of disk space for a file (in the disk data area) is done only when needed. That is, the data space is not preallocated. The space is allocated one cluster (unit of allocation) at a time where a cluster is one or more consecutive disk sectors. The clusters for a file are "chained" together, and kept track of, by entries in a File Allocation Table (FAT).

The clusters are arranged on the disk to minimize the disk head movement. All of the space on a track (or cylinder) is allocated before moving on to the next track. This is accomplished by using the sequential sectors on the lowest-numbered head, then all the sectors on the next head, and so on until all sectors on all heads of the cylinder are used. Then, the next sector to be used will be sector 1 on head 0 of the next cylinder.

For a hard (fixed) disk, the size of the FAT and directory are determined when a disk format program initializes the disk, and are based on the size of the DOS partition. To locate all of the data that is associated with a particular file stored on a hard disk, the starting cluster of the file is obtained from a directory entry, then the FAT table is referenced to locate the next cluster associated with the file. The FAT table is a linked list of clusters such that each 16-bit FAT entry for a file points the next sequential cluster used for that file. The last entry for a file in the FAT has a number which indicates that no more clusters follow. This number can be from FFF8 to FFFF (base 16) inclusive. The size of a cluster is defined when the disk is formatted and can range from 1 to 128 sectors. Each sector of a FAT can point to 256, 512, . . . , or 32768 sectors depending of the number of sectors in a cluster. The number of sectors that a FAT sector can point to is called a "track group". For redundancy reasons, two identical FATs are provided on the disk.

FIG. 1A shows a directory entry 2 consisting of 32 bytes of data. The name of the file and its extension is stored in the first 11 bytes of the directory entry 2 and a file attribute byte 6 is provided. By definition, 10 bytes (8) are reserved for future use and 2 bytes are provided to store time (10) and date (12) information. Cluster byte (14) points to the first cluster of sectors used to store the file information and the byte (14) points to the first entry of the FAT table (16) associated with the file. The last 4 bytes (18) of the directory entry (2) is used to store the size of the file.

A 16 byte section of a FAT table (20) is depicted. The first 4 bytes (21) store system information. Bytes 4 and 5 (16) are the beginning bytes of the FAT (20) used to track file information. The first cluster for data space on all disks is cluster "02". Therefore, bytes 4 and 5 (16) are associated with the first cluster of disk sectors "02" used to store file information. FAT bytes 6 and 7 (22) are associated with cluster 03 . . . and bytes 14 and 15 (24) are associated with cluster 07.

This example illustrates how sectors associated with a file referenced in the directory are located. The cluster information (14) in the directory (2) points to cluster number "02". The sectors in cluster "02" not shown, contain the first part of the data for the referenced file. Next the FAT table is referenced to see if additional clusters are used to store the file information. FAT bytes 4 and 5 (16) were pointed to by the directory entry (14) and the information stored in bytes 4 and 5 (16) point to the next cluster used for the file. Here the next cluster is "05". So, cluster "05" contains the next part of the data for the referenced file. FAT bytes 10 and 11 (26) contain an end-of-file number "FFFF" indicating there are no more clusters associated with the referenced file. All of the information associated with the referenced file was contained in clusters "02" and "05" on the disk.

Figure 1B:
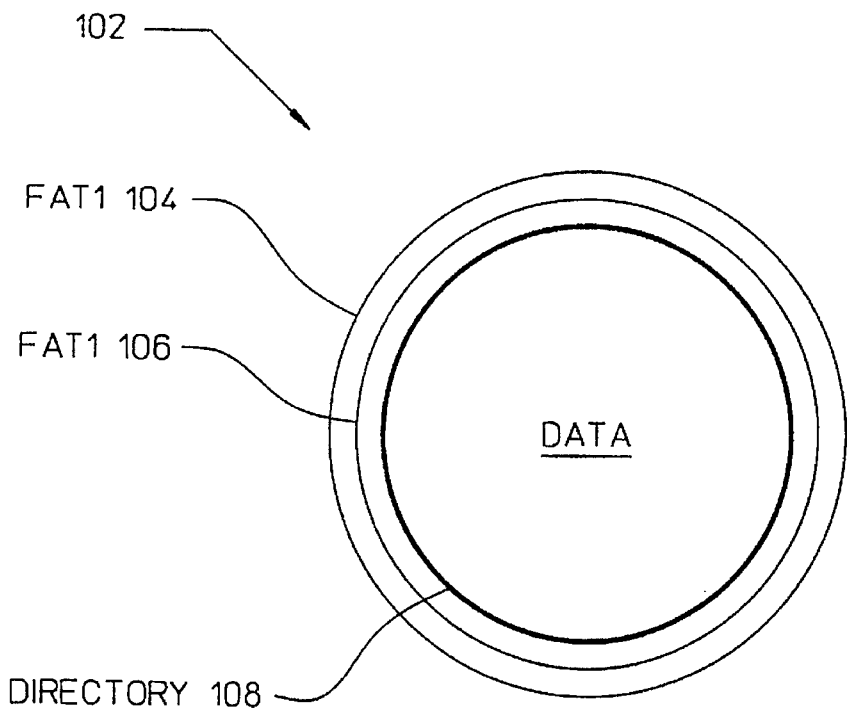
FIG. 1B illustrates the organization of the two FATs and the directory on a simple hard disk.

FIG. 1B shows a schematic view of the organization of the two FATs and the directory on a simple disk. The disk 102 has an outside track 104 which contains the first FAT information. The next inner track 106 contains the second FAT information. The next sequential track 108, toward the center of the disk, contains the directory information. The most outer track (track 0) of the disk, not shown, is reserved for the storage of the computer boot up instructions.

Figure 2:
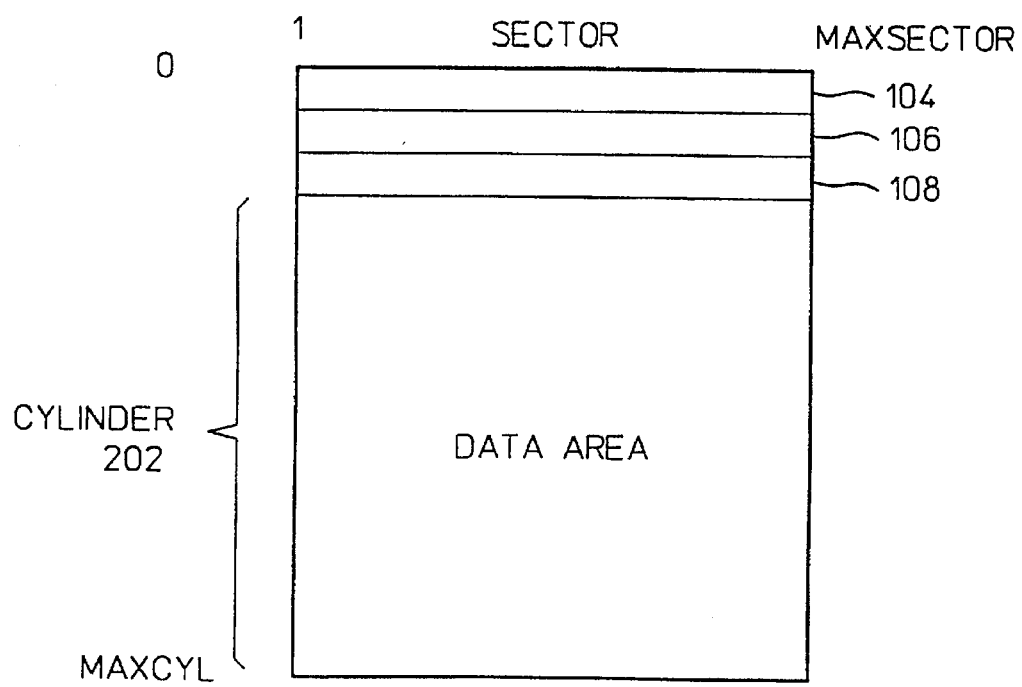
FIG. 2 is a graphical view of the storage area of a simple hard disk.

FIG. 2 shows a graphical view of the storage area of the disk in FIG. 1. The information for the FATs 104 and 106 is stored in the first and second tracks shown and the information for the directory 108 is stored in the third track shown. The remaining storage area of the disk 202 is available for storing file information. Beginning with track 1, sector 1, the operating system uses up to 128 contiguous sectors for the first copy of the FAT 1 (104). The operating system then allocates an additional, duplicate contiguous space for the FAT 2 (106). After both FATs have been allocated, the operating system allocates the next 32 contiguous sectors for the root directory 108.

The simple disk illustrated in FIG. 1 and FIG. 2 has a single recording surface and would only have a single recording head. Therefore, a track would be equivalent to a cylinder. Also for simplicity, the directory 108 and the two FATs 104 and 106 are assumed to occupy a single track each.

By following the above example, the absolute sectors used by the operating system to store a particular file on the hard disk can be readily determined. Programmatically, one would use the resources of the Basic Input Output System (BIOS), particularly interrupt 13, to read and write absolute disk sectors.

Application Program Installation

Figure 3:
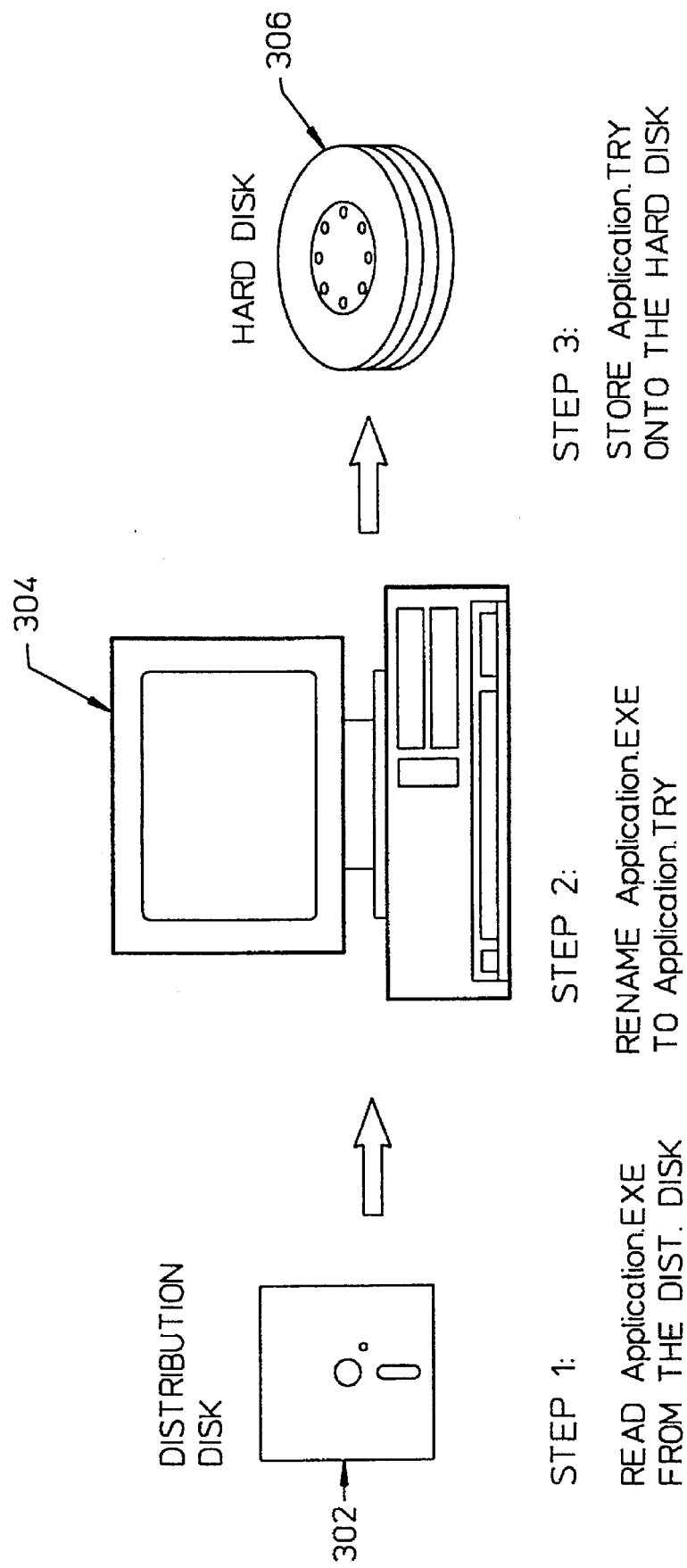
FIG. 3 is a flow chart of steps 1-3 of the application program installation method.

FIG. 3 illustrates the first three steps of the application program installation method. In step 1, the user is supplied with a distribution disk 302 which contains an encrypted copy of the application program and other files. The disk 302 can be any means of software distribution such as a floppy disk, an optical disk or file server connected to the user's computer by a network or telephone. A computer 304 reads the application program from the distribution disk 302.

In step 2, the application program, "Application EXE", is encrypted and renamed to "Application.TRY". Any encryption algorithm can be used to encrypt the application program. A simple method is to invert the bits in all or some of the bytes of data that make up the application program. More elaborate encryption algorithms such as the Data Encryption System (DES) can also be used. The more secure the encryption algorithm used, the more difficult it is to break the software protection method. Renaming a file is performed by using the MS-DOS "REN" command or other methods known to one skilled in the art.

In step 3, the encrypted and renamed application, Application.TRY, is stored onto a hard disk 306 which is part of the computer 304.

Figure 4:
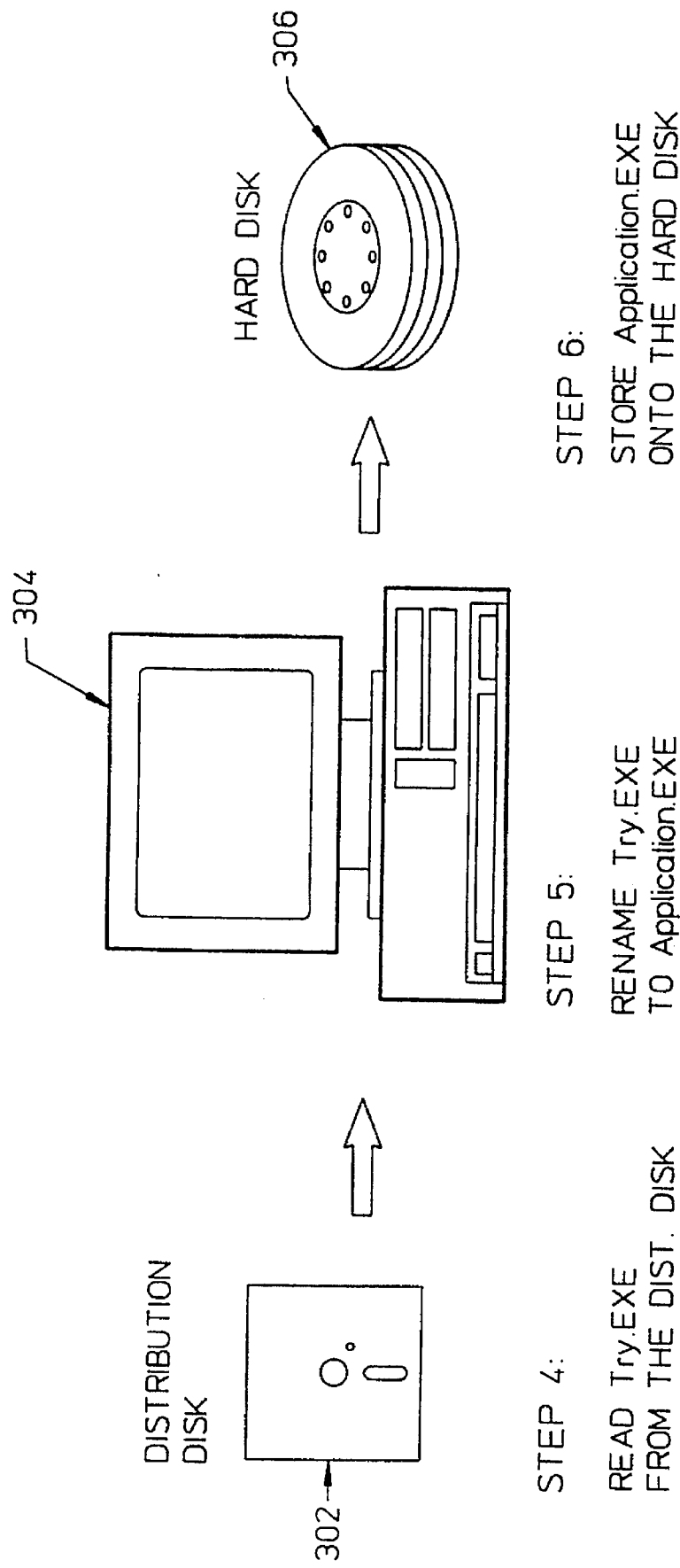
FIG. 4 is a flow chart of steps 4-6 of the application program installation method.

FIG. 4 illustrates steps 4-6 of the application program installation method. Step 4 entails reading the program Try.EXE from the distribution disk 302. The Try. EXE program is the program the user will execute to run the application program. Also, the Try. EXE program checks files on the hard disk 306 to verify the files have not been tampered with.

The program Try.EXE is renamed to Application.EXE in Step 5. This renaming is performed so that the Try program executes when the user wants to execute the application program. The Try program will execute the application program after performing verification tests. After the Try program is renamed, it is stored on the hard disk 306, in step 6, as Application.EXE.

Figure 5:
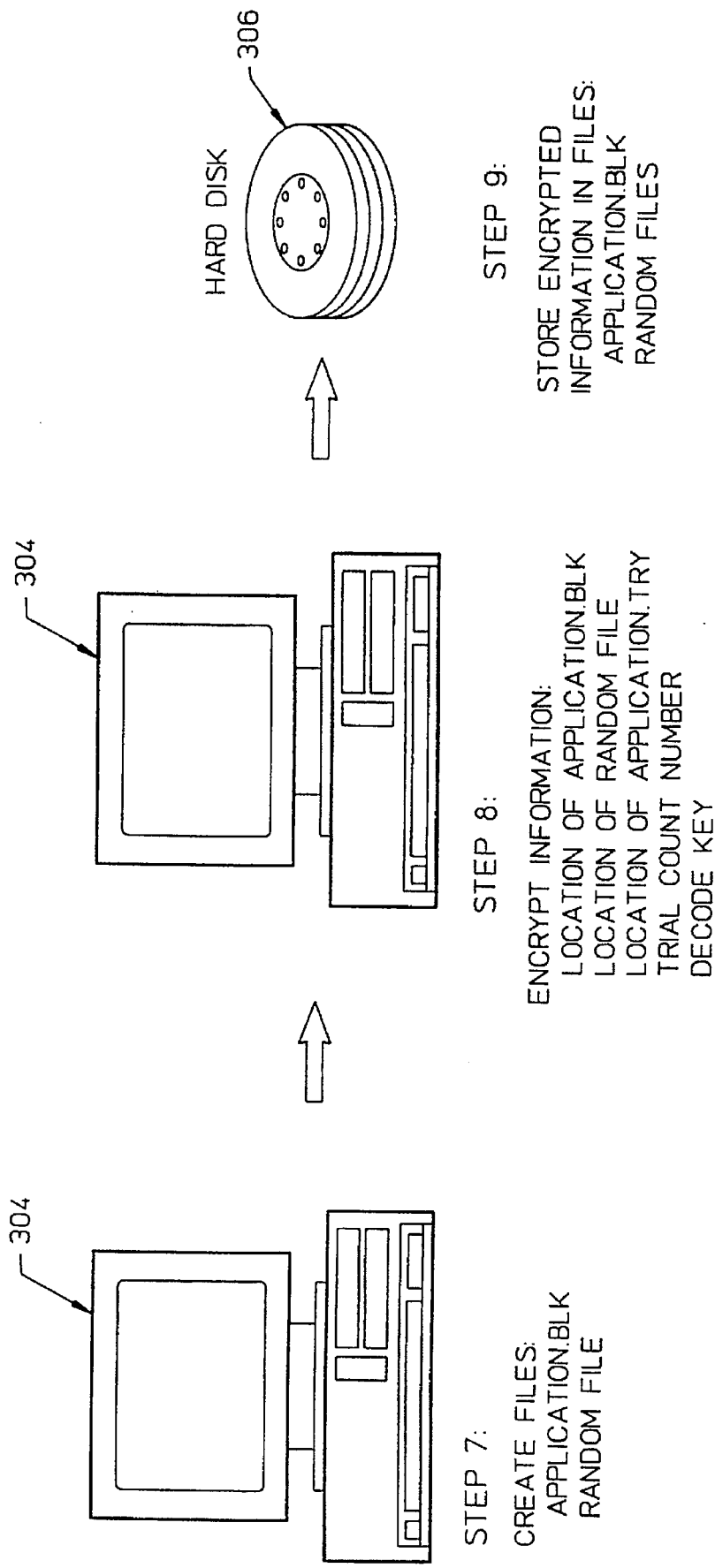
FIG. 5 is a flow chart of steps 7-9 of the application program installation method.

FIG. 5 illustrates steps 7-9 of the application program installation method. The computer 304 creates two files, Application.BLK and Random on the hard disk in step 7. Step 8 entails the encryption of the absolute disk location of the Application.BLK, Random, and the Application.TRY files along with a trial count number and a decode key. The trial count number is the number of times the application program is permitted to be executed. The decode key is used to decode the encrypted application program and can be a simple key as would be used to restore inverted bits or a complex multi-byte key. In step 9, the encrypted information from step 8 is stored in the two files Application.BLK and Random.

Figure 6:
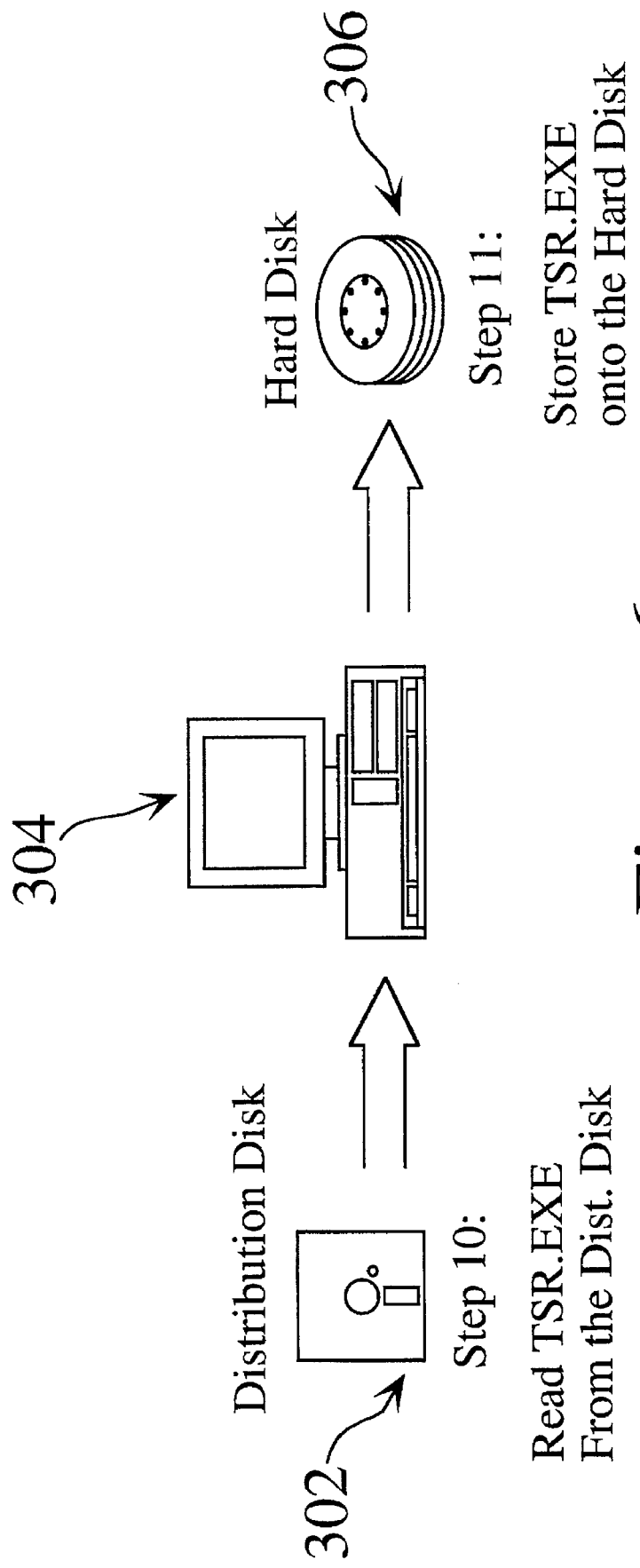
FIG. 6 is a flow chart of steps 10 and 11 of the application program installation method.

FIG. 6 illustrates steps 10-11 of the application program installation method. The distribution disk 302 contains a Terminate and Stay Resident (TSR) program, TSR.EXE, and this file is read into the computer 304 in step 10. The TSR program monitors MS-DOS disk commands to determine if the encrypted program, Application.try, is being read into the memory of the computer 304. The TSR.EXE program is stored onto the hard disk 306 in step 11.

Figure 7:
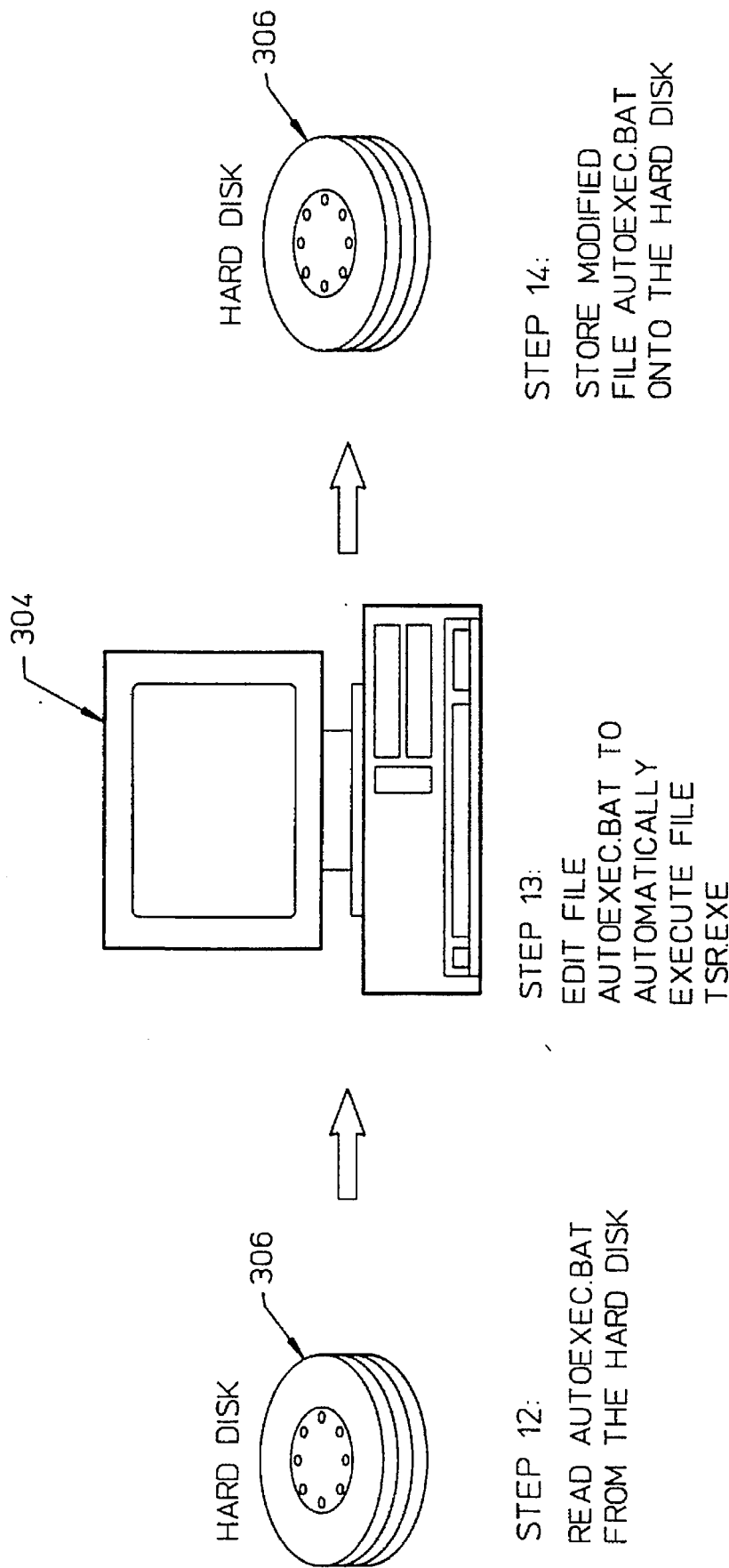
FIG. 7 is a flow chart of steps 12-14 of the application program installation method.

FIG. 7 illustrates steps 12-14 of the application program installation method. In step 12, the MS-DOS program Autoexec.BAT is read from the hard disk 306. The Autoexec.BAT program is edited to insert a command to execute the program TSR.EXE in step 13. Since Autoexec.BAT is automatically executed when the computer 304 is turned on, the TSR program will be executed and remain resident in the computer memory where it will monitor disk activity. The edited Autoexec.BAT program is stored onto the hard disk 306 in step 14.

TSR Program Installation and Function

Figure 8:
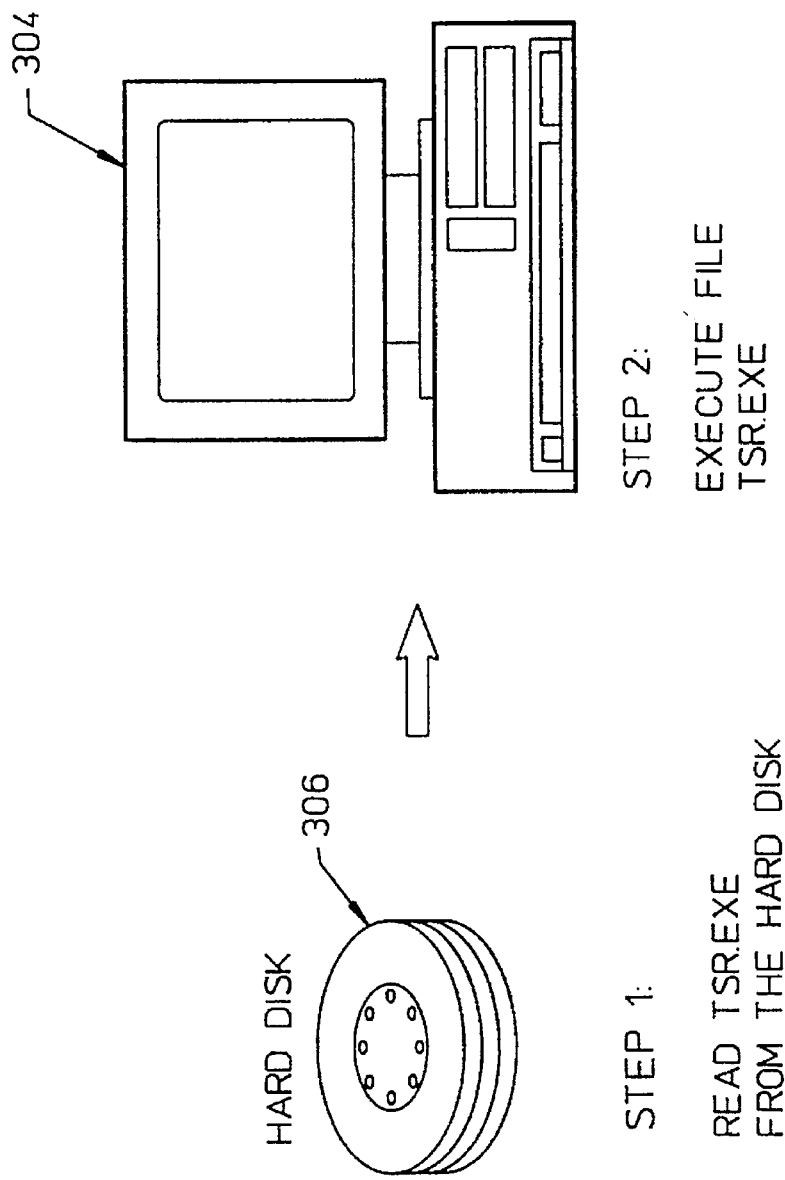
FIG. 8 is a flow chart of steps 1 and 2 of the TSR program execution method.

FIG. 8 illustrates steps 1 and 2 of the TSR program installation method. When the computer 304 is turned on (booted), the Autoexec.BAT program is automatically run. The Autoexec program is a batch program that contains a list of commands that the computer performs when it is booted. One of the commands is the command to execute the TSR.EXE program. In step 1, the computer 304 reads the TSR.EXE program from the hard disk 306 where it was previously stored. Then, the computer executes the TSR program in step 2. The TSR program is installed in the interrupt 13 chain. This installation is performed by replacing the address at the interrupt 13 location with the memory address of the TSR program. The old interrupt 13 address is stored for future use by the TSR program. Now, any program that issues an interrupt 13 request (a request for disk service) will automatically transfer control to the TSR program. The TSR program will monitor all interrupt 13 (Int.13) requests and, in particular, those that are for loading the sectors containing the encrypted sectors of the application program (Application.TRY).

Figure 9A:
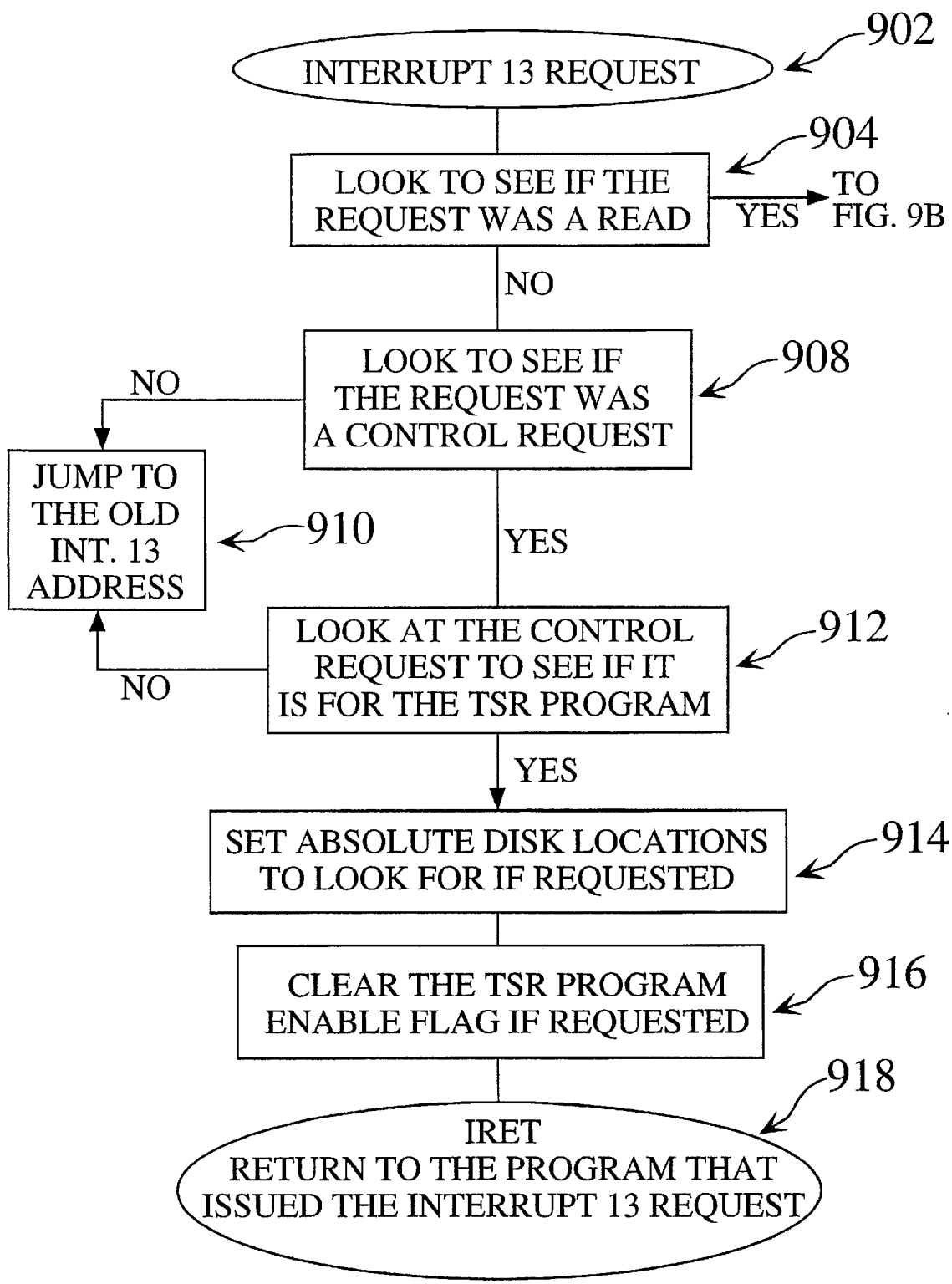
FIG. 9A is a detailed flow chart of the TSR program execution process.
Figure 9B:
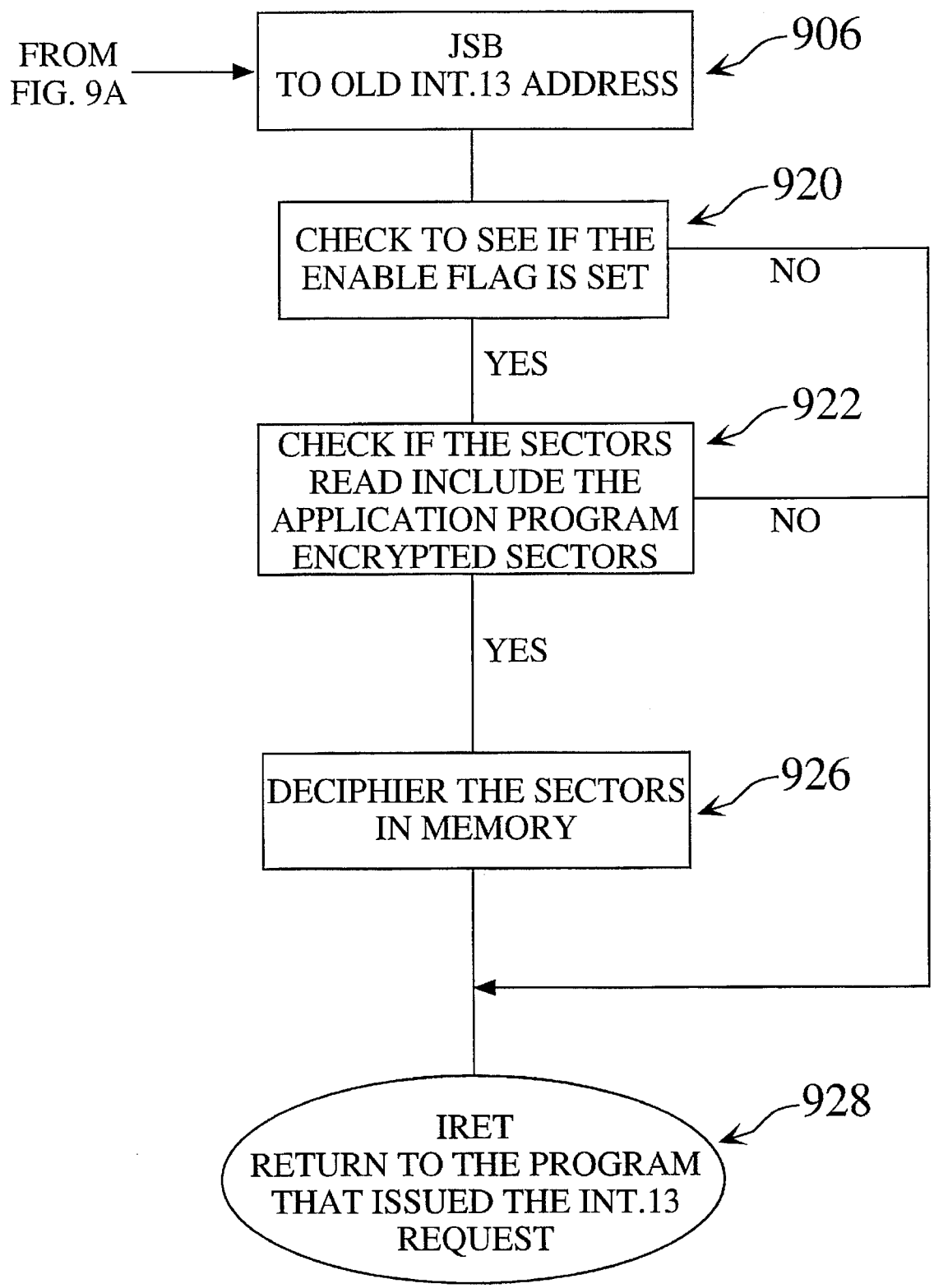
FIG. 9B is a continuation of the flow chart shown in FIG. 9A.

FIGS. 9A and 9B show a flow chart for the TSR.EXE program. The TSR process starts when an Int.13 request is issued 902. The next step 904 is to see if the Int.13 request is a read request. If it is a read request, then the process shown in FIG. 9B, starting with block 906, is performed. If the Int.13 request is not a read request, then see if the request is a control request 908. If the request is not a control request, then the TSR program does not need to perform any function and control is transferred to the program located at the old Int.13 address 910. If a control request was issued, then check to see if the control request is for the TSR program 912. If the control request is not for the TSR program, then the TSR program does not need to perform any function and control is transferred to the program located at the old Int.13 address 910.

If the control request is for the TSR program, then the TSR program performs one of two functions 914 or 916. In block 914, the TSR program stores the absolute disk location of the sectors used to store the Application.TRY program. By storing the location of the encrypted disk sectors, the TSR program can examine a disk read request to determine if one or more of the sectors that stores the application program has been requested. The TSR also maintains an enable flag. If the flag is enabled, then the TSR program will decode encrypted disk sectors that have been read into memory. However, if the flag is "cleared" then the TSR program is effectively disabled. One of the control requests that the TSR will perform is to clear the flag 916. After any control requests have been performed, the TSR performs a IRET command 918 which returns control to the program that issued the Int.13 request.

If the Int.13 request is a read request, then the process depicted in FIG. 9B is performed. In block 906, a jump to subroutine (JSB) is performed to the old Int.13 address. This causes the program at the old Int.13 address to perform its function, typically this program reads the disk sectors, and then returns control back to the TSR program. After control is returned to the TSR program, the TSR program checks to see if the enable flag is set 920 and checks to see if the sectors read include sectors containing the application program 922. If the flag is not set or the sectors do not contain the application program, then the TSR program performs an IRET command 928 which transfers control back to the program that issued the Int.13 request.

After all the checks have been completed, the TSR program now deciphers the disk sectors 926, containing the encrypted application program, that have been read into memory. The TSR program uses the key passed to it by a Int.13 control request to decipher the sectors. Depending on the encryption method used, the key can be simple or very complex. After the sectors have been deciphered, the TSR program performs an IRET command 928 to return control back to the program that issued the Int.13 request.

Application program execution

Figure 10:
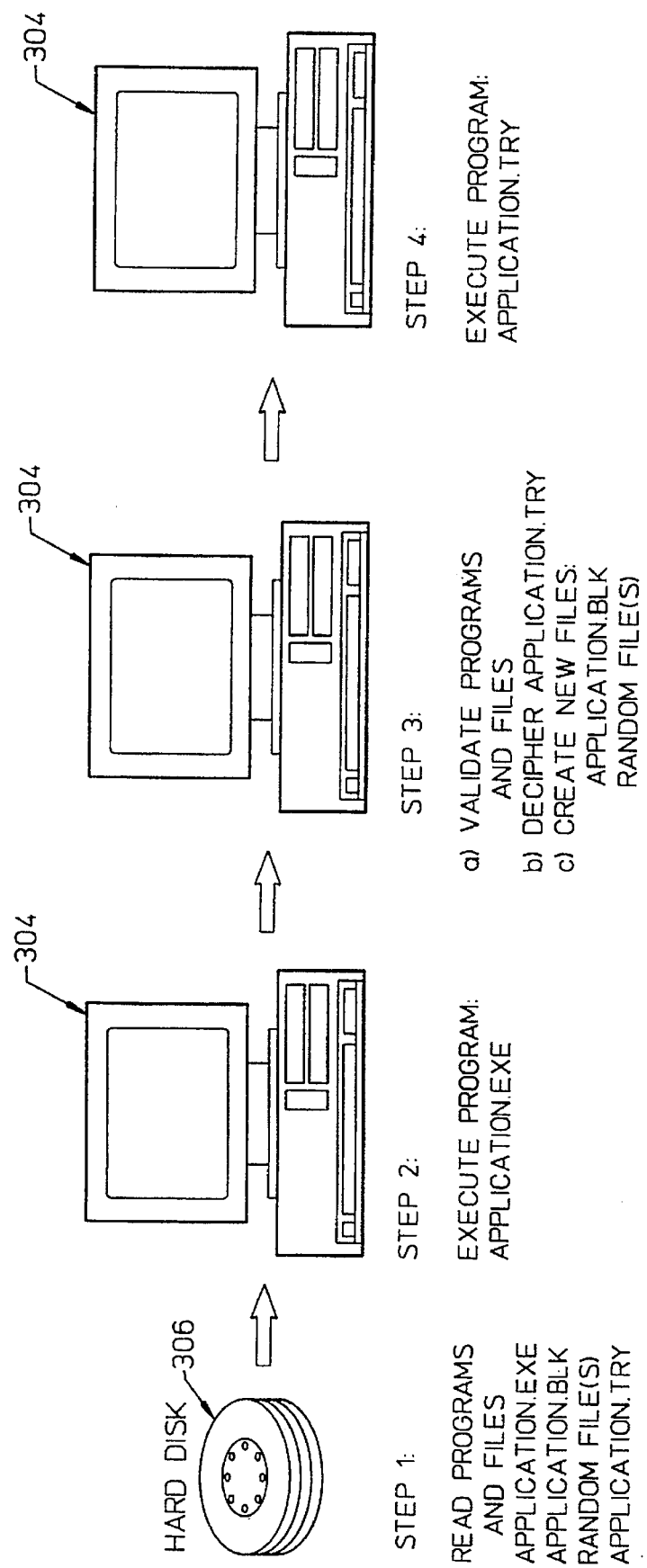
FIG. 10 is an overview flow chart of the application program execution process.

FIG. 10 illustrates the basic functions that occur when the application program is executed. In step 1, the programs Application.EXE and Application.TRY, and the files Application.BLK and the Random file(s), are read from the hard disk 306. The Application.EXE program is executed in step 2. In step 3, the Application.EXE program validates the Application.TRY program, the Application.BLK file and the Random file(s). If the program and files are validated, then the Application.EXE program causes the Application.TRY program to be deciphered and creates a new Application.BLK file and new randomly named files. Then in step 4, the Application.TRY program is executed and the user can use the application program.

Figure 11A:
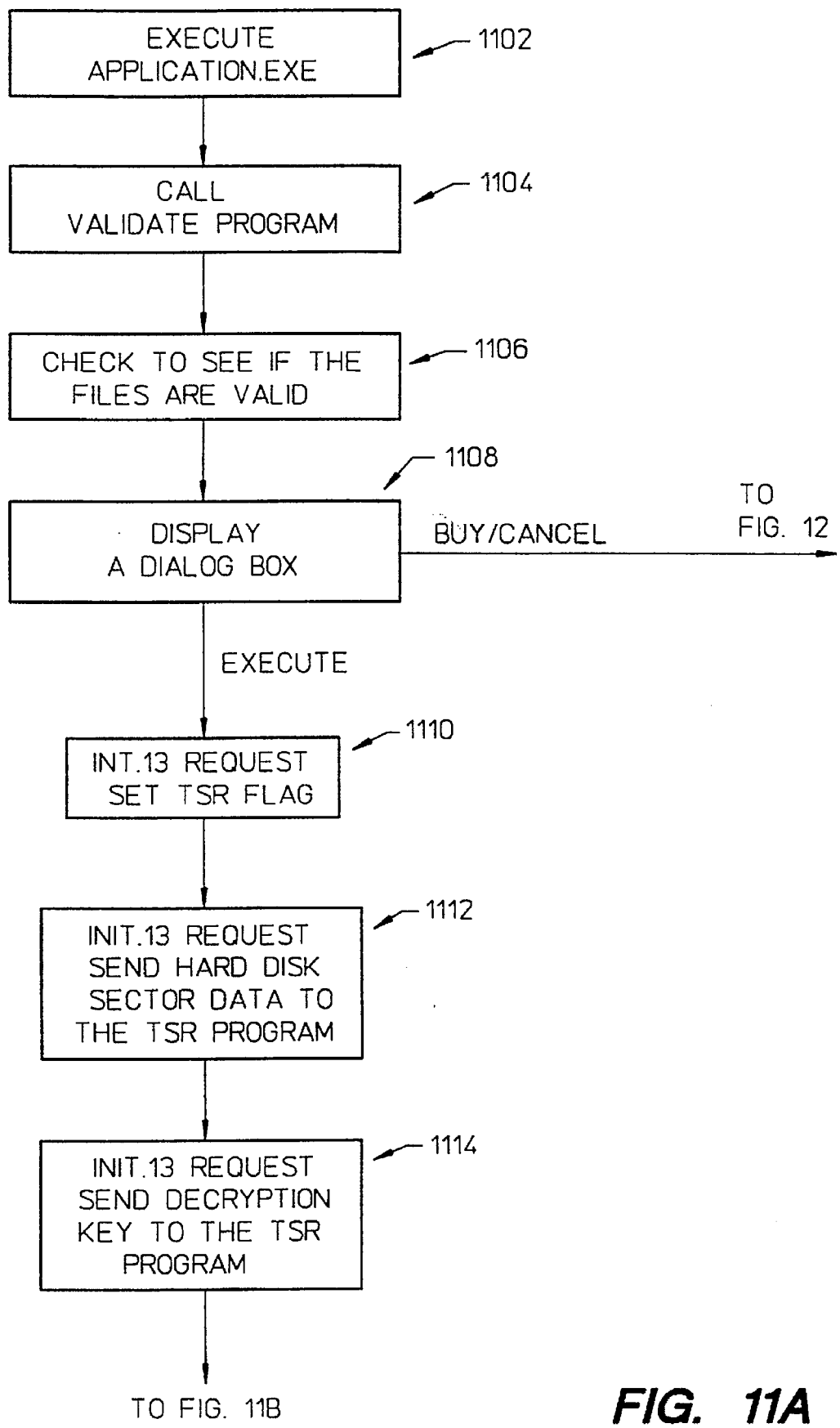
FIG. 11A is a detailed flow chart of the application program execution method.
Figure 11B:
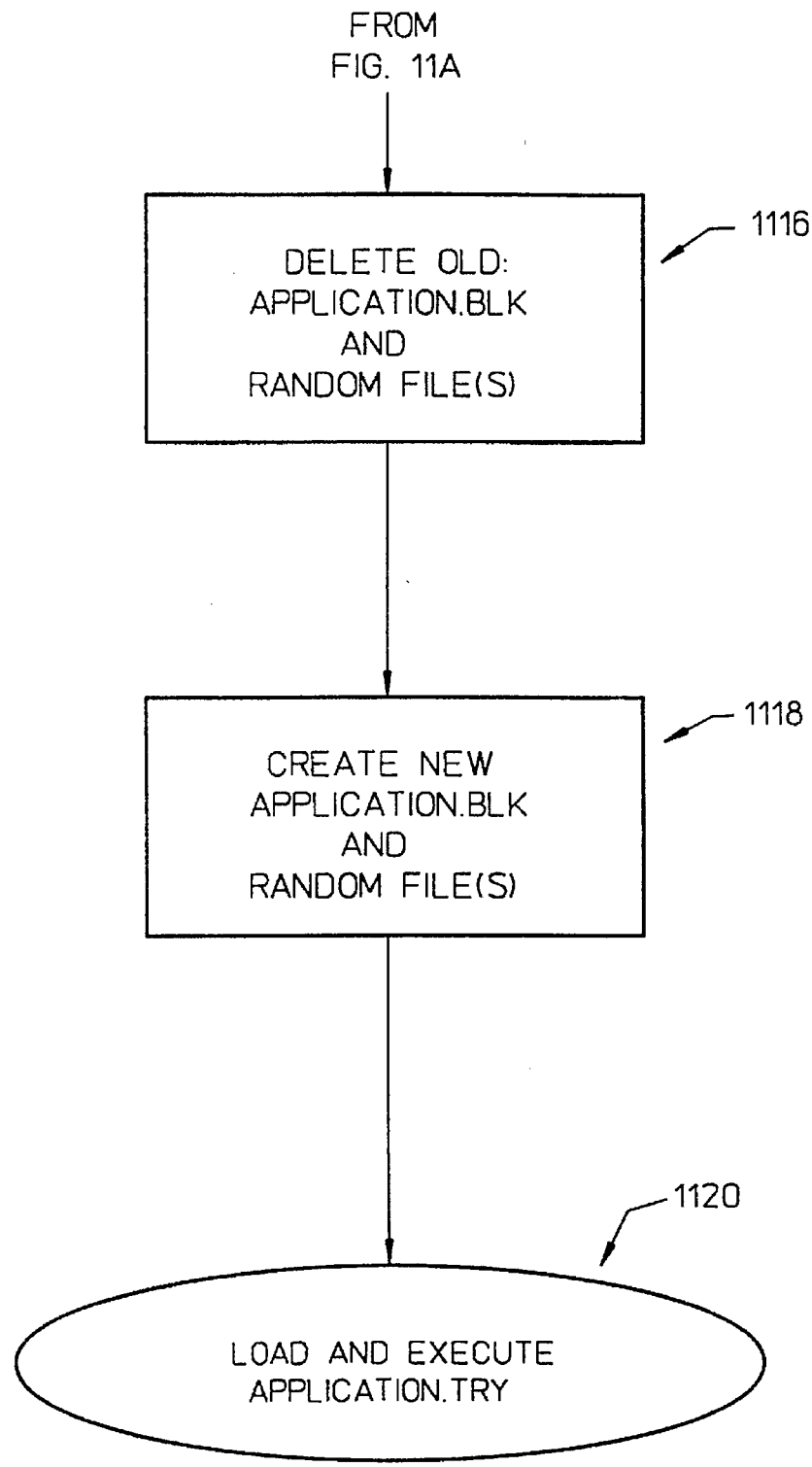
FIG. 11B is a continuation of the flow chart shown in FIG. 11A.
Figure 12:
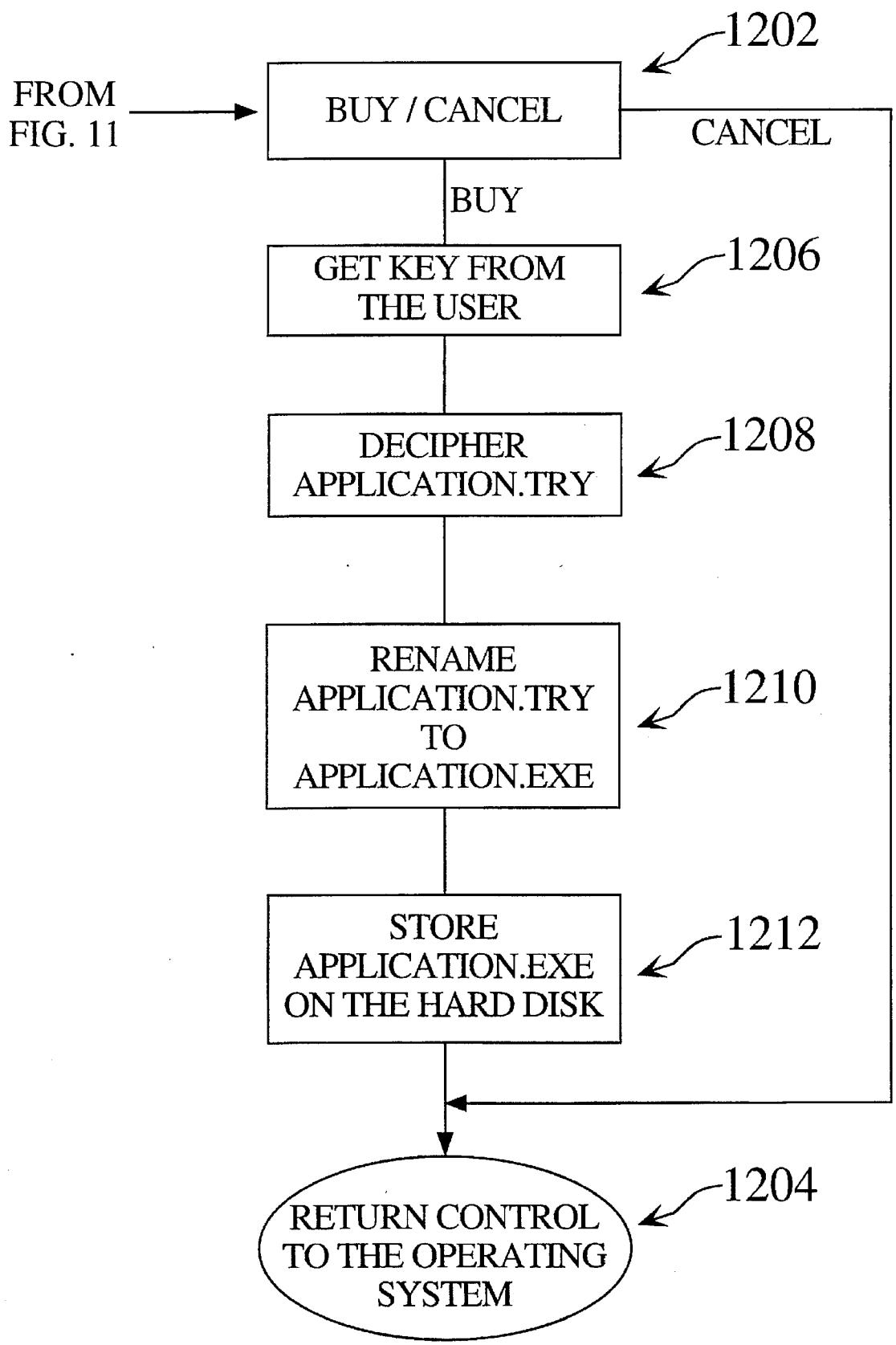
FIG. 12 is a continuation of the flow chart of FIG. 11A.
Figure 13:
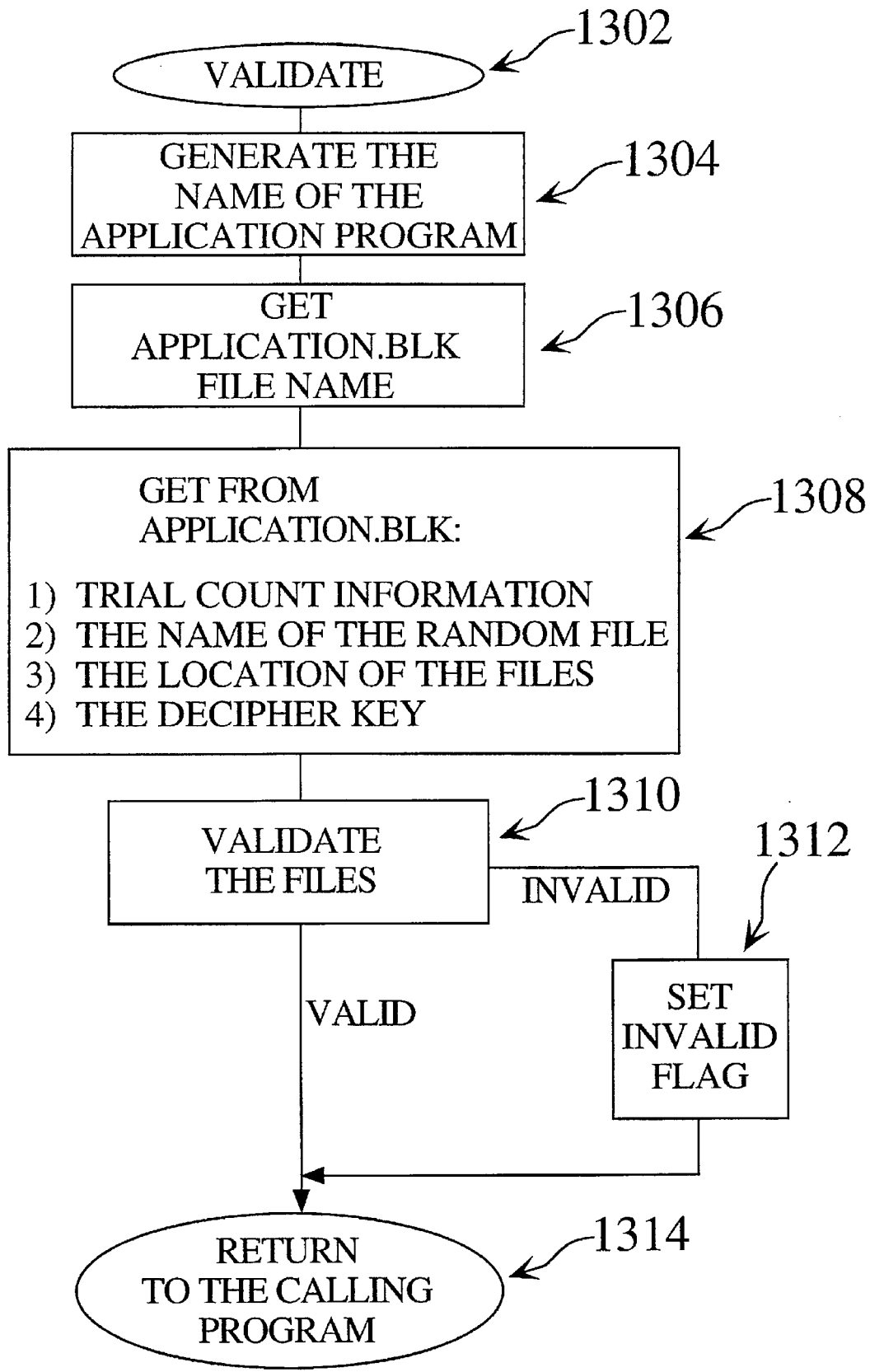
FIG. 13 is a flow chart of the Validate program.

FIGS. 11A, 11B and 12 illustrate a detailed flow chart for the execution of the application program. After the TSR program has been loaded and executed, described above, the user causes the program Application.EXE to execute. As previously described, the program Application.EXE is the former Try.EXE program. When Application.EXE is executed 1102, the program "Validate" is called 1104. The Validate program checks to see if the user is authorized to run the application program. A flow chart for the validate program is shown in FIG. 13. A validation flag is returned by the Validate program. Application.EXE checks the validation flag to determine whether the user will be allowed to execute the application program.

After the validation process, the Application.EXE program displays, on the user's computer 304, a dialog box 1108. This dialog box gives the user three choices:
1. To buy the program
2. To cancel the request to execute the application
3. To execute the application program If the validation flag is set (some violation was detected), then the user can only buy the program or cancel the request. The user selecting the execute option causes the Application.EXE program to issue Int.13 requests. The first Int.13 request 1110 sets the flag in the TSR program. This is accomplished by sending the TSR program a control request causing the TSR flag to be set and enabling the TSR program to decipher encrypted hard disk sectors. A second Int.13 request 1112 passes, to the TSR program, the absolute location on the hard disk of the sectors used to store the application program. The third Init.13 request sends, to the TSR program, a key used by the TSR program to decipher the encrypted disk sectors.

The Application.EXE program deletes the Application.BLK and the Random file(s) from the hard disk 1116 and creates new files 1118. This process is essentially the same as process described in conjunction with FIG. 5, steps 7–9. However, the trial count number is decremented by one from the previous value to reflect the current execution of the application program.

Now the Application.EXE program causes the operating system to load and execute the Application.TRY program 1120 thereby running the application program. During the process of loading the Application.TRY program, an Int.13 request will be issued thereby causing the TSR program to decipher the necessary hard disk sectors that are loaded into the memory of the computer 304.

If the validation flag was set or if the user selected the buy or cancel options displayed by the dialog box, then the process illustrated in FIG. 12 is perforated. At the buy/cancel option point 1202, if the user selects cancel, then the Application.EXE program terminates and transfers control back to the operating system 1204. The user may wish to select the cancel option if the number of times the user can still execute the application program is small and the current task is not very important.

If the buy option is selected, then the user is prompted to input a key 1206. Typically if the user selected the buy option, a second dialog box (not shown) would be displayed giving the user the telephone number of the software vendor to call. The user would then receive the required key by purchasing the program over the telephone from the software vendor. After verifying the key, the Application.EXE program deciphers the Application.TRY program 1208 and then renames the program Application.TRY to Application.EXE 1210. The deciphered application program is then stored onto the hard disk 1212. Control is now returned to the operating system 1204. At this point, the application program is no longer protected and can be executed by the user an unlimited number of times.

FIG. 13 illustrates a flow chart for the Validate program which is called by the Application. EXE program to verify the integrity of the application locking method. After the Validate program is called 1302, the name of the application program is generated 1304. Since the validate program may be called to verify a number of application programs, this name generation step is required to determine which application program to check. The name of the program calling the verify program is used to generate the application program name. For example, the Application.EXE program might really be named "Wordperfect.EXE" and therefore the verify program will know to examine the files related to the Wordperfect application program. By knowing the name of the application program the verify program will determine the Application.BLK file name 1306. In the above example, the Application.BLK will really be named Wordperfect.BLK.

The verify program extracts from the Application.BLK file the trial count information, the name of the random file associated with the application and the decipher key 1308, the locations of the files and a decipher key. This information is encrypted in the Application.BLK and the Random files and must be deciphered according to the cipher method used.

The validate program now checks to see if the user is permitted to execute the application program 1310. If there are no more permitted runs of the application program available, the validate flag is set 1312 and the Validate program returns control to the calling program 1314. The locations of all the files associated with the application program are also checked to see if any of the files have been moved. If one or more files have moved, then the invalid flag is set 1312 and the Validate program returns control to the calling program 1314. Should the trial count, file names and locations, and the decipher process all verify the user can execute the application program, the Validate program does not set the invalid flag and returns control to the calling program 1314.

Conclusion

Except when the user buys the program, the application program is never available on the hard disk in an unciphered form and therefore the security of this new and novel method is high. Also, while a particular embodiment of this invention has been described, it will be obvious to one skilled in the art that modifications to this method can be made while still enjoying the benefits of this invention. For example, instead of a single random file being generated, a larger number of random files can be generated thereby increasing the difficulty in defeating this novel program locking method. The above example is intended to illustrate one embodiment of the present invention and is not to be viewed as a limitation of the scope of this invention which is defined solely by the following claims.

I claim:

1. A computer implemented method to unlock a software program, the software program having a known original sector location and a current sector location on a hard disk having sectors, comprising the steps of:

causing the software program to execute if a verification process determines that all of the following conditions are true:

1. the current sector location of the software program on the hard disk is the same as the known original sector location on the hard disk where the computer retrieves the known original sector location on the hard disk; and 2. the computer determines that the software program has been executed less than a trial count number by retrieving from either a first file or a second randomly-generated and randomly-stored file the number of times the program has been executed and determining that the number of times the program has been executed does not exceed the trial count number; and 3. the computer determines that the current sector location on the hard disk of the first file, is the same location as the sector location on the hard disk at which said first file was originally stored by retrieving from said first file or a third randomly-generated and randomly-stored file the original sector location on the hard disk of the first file and comparing the original sector location on the hard disk to the current sector location on the hard disk.

2. A method as in claim 1 further comprising the steps of:

a) retriving, from a file, a decipher key; and b) utilizing the decipher key to decipher the software program as the computer retrieves the software program from the hard disk and stores the program in a computer memory while keeping the software program on the hard disk encrypted.

3. A method as in claim 1 wherein the verification process executes the software program only if the current sector location of the software program on the hard disk is the same as the known original sector location on the hard disk where the computer retrieves the known original sector location on the hard disk from a fourth computer file previously stored at an original sector location on the hard disk.

* * * * *